United States Patent
Ogura et al.

(10) Patent No.: US 6,189,092 B1
(45) Date of Patent: Feb. 13, 2001

(54) PIPELINE PROCESSOR CAPABLE OF REDUCING BRANCH HAZARDS WITH SMALL-SCALE CIRCUIT

(75) Inventors: Satoshi Ogura, Moriguchi; Shinji Ozaki, Osaka, both of (JP)

(73) Assignee: Matsushita Electric Industrial Co., Ltd., Osaka-fu (JP)

(*) Notice: Under 35 U.S.C. 154(b), the term of this patent shall be extended for 0 days.

(21) Appl. No.: 09/099,299

(22) Filed: Jun. 18, 1998

(30) Foreign Application Priority Data

Jun. 30, 1997 (JP) .................................................. 9-174551

(51) Int. Cl.[7] ....................................................... G06F 9/38
(52) U.S. Cl. ............................................. 712/241; 712/234
(58) Field of Search ...................................... 712/233, 200, 712/237, 241, 239, 213, 207, 234; 395/708; 711/213

(56) References Cited

U.S. PATENT DOCUMENTS

| | | | |
|---|---|---|---|
| 4,463,422 | 7/1984 | Storer et al. | 712/241 |
| 4,714,994 | 12/1987 | Oklobdzija et al. | 712/207 |
| 4,725,947 | 2/1988 | Shonai et al. | 712/238 |
| 4,807,126 | 2/1989 | Goutu et al. | 395/709 |
| 5,450,585 | 9/1995 | Johnson | 395/709 |
| 5,506,976 | 4/1996 | Jaggar | 712/238 |
| 5,522,053 | * 5/1996 | Yoshida et al. | 711/213 |
| 5,617,550 | * 4/1997 | Matsuo et al. | 712/207 |
| 5,848,268 | * 12/1998 | Matsuo | 712/233 |
| 5,850,551 | * 12/1998 | Takayama et al. | 395/708 |

FOREIGN PATENT DOCUMENTS

| | | |
|---|---|---|
| 270310 | 6/1988 | (EP) . |
| 487082 | 5/1992 | (EP) . |
| 0742518 | 11/1996 | (EP) . |

OTHER PUBLICATIONS

"Compiling for the Horizon Instruction Set," by J.M. Draper, Conpar 88, Manchester, UK Sep. 12–16, 1988.

"Reducing the Cost of Branches by Using Registers," byJ.W. Davidson et al., 17th Annual Int'l Symposium on Computer Architecture, May 28–31, 1990.

"The Horizon Supercomputer System: Architecture and Software," J.G. Kuehn et al., Supercomputing' 88, Orlando FL, Nov. 14–18, 1988 ISBN.

Computer Architecture: A Designer's Text Based on Generic Risk, McGraw–Hill, Inc. Jan. 1994.

"Simple Algorithm for Locking Short Loops 1–15 in an Instruction Buffer", IBM Technical Disclosure Bulletin, vol. 24, No. 1, Jun. 1982, pp. 56–58.

* cited by examiner

*Primary Examiner*—William M. Treat
*Assistant Examiner*—Walter Benson
(74) *Attorney, Agent, or Firm*—Price and Gess

(57) ABSTRACT

A processor executes a program loop at high speed using a branch target information register instruction which is set immediately before the program loop and a high-speed loop instruction which is set at an end of the program loop. When the branch target information register instruction is decoded by an instruction decoder, code in a fetched instruction buffer is sent to a branch target instruction register, and a shifted pointer in a decoded instruction counter is sent to a branch target fetch address register. After the high-speed loop instruction has been decoded by the instruction decoder and a branch condition is satisfied, the pointer in the branch target fetch address register is sent to a fetched instruction counter and to the decoded instruction counter while the code in the branch target instruction register is sent to a decoded instruction buffer. By using the shifted pointer in the decoded instruction counter, the high-speed loop instruction can be efficiently executed with small-scale hardware.

17 Claims, 13 Drawing Sheets

FIG. 5

| NUMBER OF VALID BYTES | SELECTOR OUTPUT |
|---|---|
| 0 | INPUT 0 |
| 1 | INPUT 1 |
| 2 | INPUT 2 |
| 3 | INPUT 3 |
| 4 | INPUT 4 |

FIG. 6

| BRANCH INSTRUCTION | OPERATION |
|---|---|
| branch abs_adrs | abs_adrs → FIC141 — 601<br>abs_adrs + 4 → DIC151 — 602<br>— 603 |
| call abs_adrs | abs_adrs → FIC141 — 604<br>DIC151 + INSTRUCTION WORD LENGTH → DIC151 — 605<br>DIC151 − 4 → STACK — 606<br>abs_adrs + 4 → DIC151 — 607 |
| ret | STACK → FIC141 — 608<br>STACK + 4 → DIC151 — 609 |
| branch rel_adrs | (rel_adrs) + DIC151 → DIC151 — 610<br>(rel_adrs) + DIC151 − 4 → FIC141 |

FIG. 10

| ADDRESSING INSTRUCTION | OPERATION | |
|---|---|---|
| branch abs_adrs | abs_adrs → FIC241 | 1001 |
| | FIC241 + 4 → DIC251 | 1002 |
| call abs_adrs | abs_adrs → FIC241 | 1003 |
| | DIC251 + INSTRUCTION WORD LENGTH → DIC251 | 1004 |
| | DIC251 −4 → STACK | 1005 |
| | FIC241 + 4 → DIC251 | 1006 |
| ret | STACK → FIC241 | 1007 |
| | FIC241 + 4 → DIC251 | 1008 |
| branch rel_adrs | (DIC251 −4) + rel_adrs → FIC241 | 1009 |
| | FIC241 + 4 → DIC251 | 1010 |

FIG. 13

| NUMBER OF VALID BYTES | SELECTOR OUTPUT | 121a~121d OUTPUT |
|---|---|---|
| 0 | — ANY INPUT | — |
| 1 | INPUT 4 | DABC |
| 2 | INPUT 3 | CDAB |
| 3 | INPUT 2 | BCDA |
| 4 | INPUT 1 | ABCD |

PIPELINE PROCESSOR CAPABLE OF REDUCING BRANCH HAZARDS WITH SMALL-SCALE CIRCUIT

BACKGROUND OF THE INVENTION

1. Field of the Invention

The present invention relates to a processor for executing machine-language instruction sequences using pipeline processing, and especially relates to a processor for executing branch processing at high speed.

2. Description of the Prior Art

Pipeline processing is known as one of the fundamental techniques for achieving high-speed processing by a Central Processing Unit (CPU: hereinafter processor). In pipeline processing, a process dealing with one instruction is divided into smaller stages (pipeline stages), each pipeline stage being processed in parallel to speed up the processing. However, this technique is not effective in executing branch instructions which are used in loops because a stall can occur. This phenomenon is called a branch hazard. Due to branch hazards, the operational performance of pipeline processing does not reach an optimal level.

A specific example of a program where a branch hazard will occur is given below. The appended comments written after the semicolons show the contents of the separate instructions.

(Instruction 1) mov 0,i ; Transfer 0 into i.
L: ; Label showing a branch target.
(Instruction 2) add a,b,c ; Transfer a+b into c.
(Instruction 3) mul a,b,d ; Transfer a×b into d.
(Instruction 4) add i,1,i ; Add 1 to i.
(Instruction 5) cmp i,3 ; Compare i with 3.
(Instruction 6) bcc L ; Branch to L if i<3.

When executing the above program, the procedure in Instructions 2–5 is looped three times. In the program, the execution of Instruction 6 is followed by three stages of fetching, decoding, and executing Instruction 2 in the next three cycles. This results in a branch hazard over two cycles between the execution of Instruction 6 and the execution of Instruction 2.

As a technique for avoiding branch hazards, a processor is disclosed in Japanese Laid-Open Patent Application No. 8-314719.

In this technique, code that includes the first instruction of a loop is stored into a buffer just before the loop is started. When the program branches from the last instruction of the loop to the first instruction, the code is retrieved from the buffer and the first instruction is decoded and executed. With such an arrangement, the first instruction does not need to be fetched from an external memory each time the loop is executed, so that the branch hazards can be avoided.

However, the conventional processor described above has a drawback that its circuit is of large scale, since the processor needs a specific circuit for avoiding the branch hazards.

First, the processor has to be equipped with an adder that is specifically used for calculating a fetch address of code that follows the code including the first instruction of the loop while the code including the first instruction is stored into the buffer just before the loop is started. The calculated fetch address is then stored into an address buffer.

The processor also has to be equipped with a subtractor that is specifically used for calculating an address of the first instruction to be decoded using the fetch address that is retrieved from the address buffer when the processing branches from the last instruction to the first instruction.

This inclusion of the adder and the subtractor results in an increase in the hardware scale of the conventional processor described above.

SUMMARY OF THE INVENTION

It is an object of the present invention to provide a pipeline processor that can reduce branch hazards with a small-scale circuit.

The above object can be fulfilled by a processor for executing a program loop at a high speed using a register instruction which is set immediately before the program loop and a loop instruction which is set at an end of the program loop, the processor including: a fetch unit for fetching code from a memory; a decoding unit for decoding an instruction included in the fetched code; and an execution unit for executing the decoded instruction, the decoding unit including a decoded instruction counter for storing and updating a pointer specifying an instruction that is being decoded, the pointer being a sum of a fixed shift value and an address of the instruction that is being decoded, and the execution unit including: a storage unit for storing, when the decoding unit decodes the register instruction, code at a start of the program loop that has been fetched by the fetch unit into a first buffer and storing the pointer stored in the decoded instruction counter into a second buffer; and a high-speed branch unit for having the fetch unit fetch code, when the loop instruction has been decoded by the decoding unit and a branch condition is satisfied, starting from an address that corresponds to the pointer stored in the second buffer and for having the decoding unit decode the code stored in the first buffer, wherein the fixed shift value is determined so that the pointer in the second buffer corresponds to an address of code that follows the code stored in the first buffer.

Here, the fixed shift value may be equal to a storage size of the first buffer.

Here, the decoded instruction counter, when initialized, may store a sum of a start address and the fixed shift value.

With the stated construction, it is no longer necessary to perform the add operation when executing a register instruction nor the subtract operation when executing a loop instruction, since the pointer that is the sum of the currently-decoded instruction address and the fixed value is stored in the decoded instruction counter. With no need to include the specific adder nor the specific subtractor, the hardware scale of the processor can be reduced. Also, the processing can be speeded up when executing the register instruction and the loop instruction, since the above address calculations are no longer necessary.

Here, the execution unit may further include a branch unit for sending, when a branch instruction with an absolute address is decoded by the decoding unit, the absolute address to a fetched instruction counter in the fetch unit and sending a value, obtained by adding the fixed shift value to the absolute address, to the decoded instruction counter.

Here, when a branch instruction with a relative address is decoded by the decoding unit, the branch unit may send a value, obtained by adding the relative address to the pointer stored in the decoded instruction counter, to the decoded instruction counter and send a value, obtained by subtracting the fixed shift value from the value which is sent to the decoded instruction counter, to the fetched instruction counter.

With the stated construction, branch instructions with an absolute address and a relative address are executed using the pointer stored in the decoded instruction counter.

Here, the fetched instruction counter may include a register for storing a fetch address and an adder for incrementing the fetch address stored in the register, wherein, when the branch instruction with the absolute address is decoded by the decoding unit, the branch unit has the adder in the fetched instruction counter add the fixed shift value to the absolute address and sends an adding result to the decoded instruction counter.

With the stated construction, when executing a branch instruction with an absolute address, the calculation of the pointer to be stored in the decoded instruction counter can be performed not by the execution unit but by the adder in the fetched instruction counter.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 5 shows the selection logic of the selection unit 143;

FIG. 6 shows the operation contents of branch instructions;

FIG. 10 shows the operation contents of branch instructions;

FIG. 13 shows the selection logic of the selectors 121a–121d shown in FIG. 12.

DESCRIPTION OF THE PREFERRED EMBODIMENTS

First Embodiment

The following is a detailed explanation of a processor of embodiments of the present invention with reference to the figures.

Figure 1:
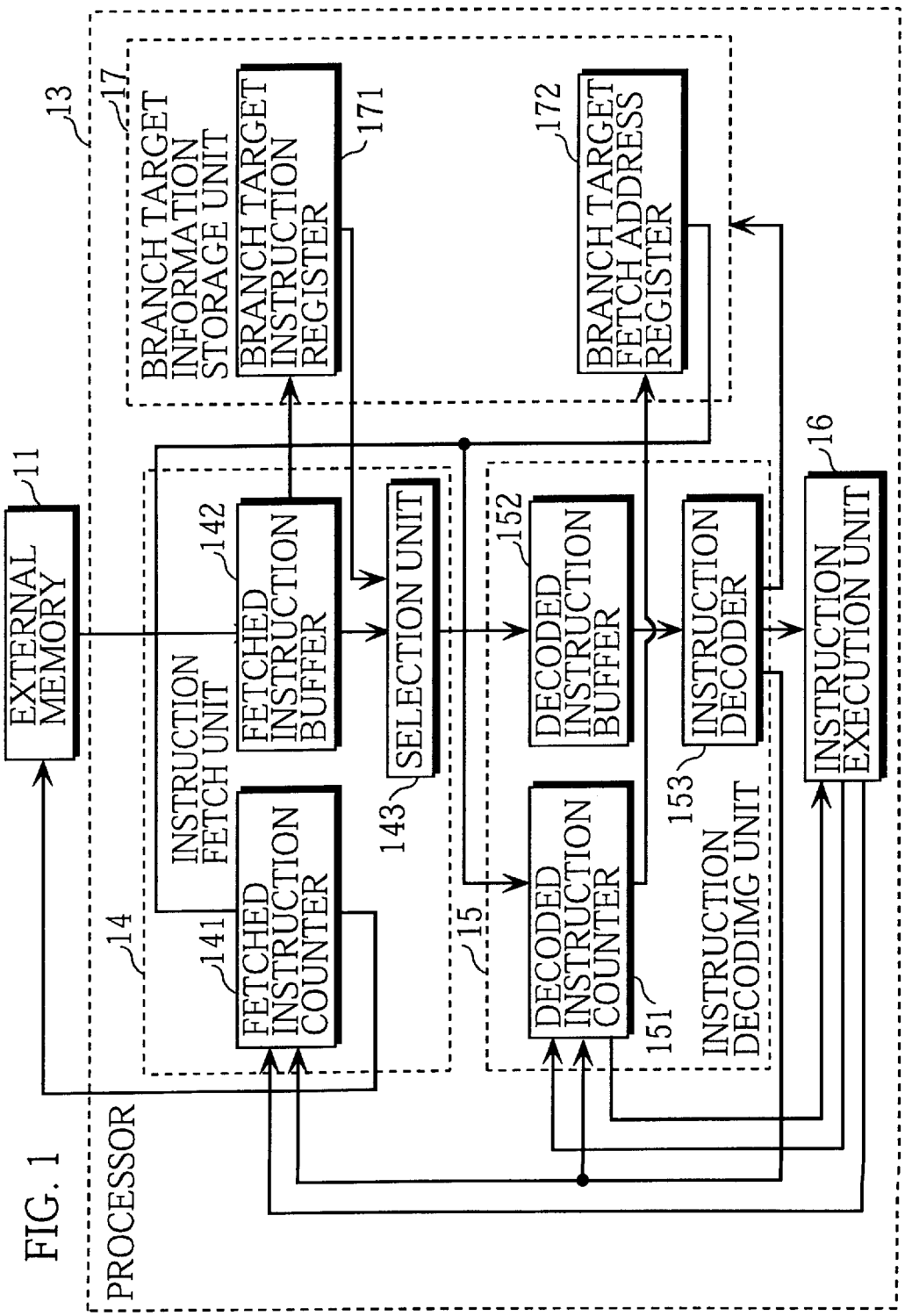
FIG. 1 is a block diagram showing the construction of the processor of the first embodiment of the present invention.

FIG. 1 is a block diagram showing the construction of the processor of the first embodiment of the present invention. The figure also shows an external memory 11 which stores an instruction sequence (program) that is to be processed by the processor 13.

The processor 13 fetches at least one instruction from the external memory 11, and decodes and executes the instructions one by one. The processor 13 is constructed in such a way as to execute a loop at high speed with small-scale hardware. The loop is specified by a combination of a branch target information register instruction (hereinafter, register instruction) and a high-speed loop instruction.

Here, the register instruction is set immediately before a first instruction of the loop and instructs the processor to register code that includes at least one instruction that is located at the start of the loop into the processor. Here, the term "code" refers to code that expresses the instructions. The high-speed loop instruction is set at the end of the loop and instructs the processor to branch to the first instruction of the loop if a condition included in the high-speed loop instruction is satisfied, wherein the first instruction has been stored in the processor according to the register instruction. The register instruction and the high-speed loop instruction are respectively written as "setlb" and "lcc" in mnemonic form.

The processor 13 includes an instruction fetch unit 14, an instruction decoding unit 15, an instruction execution unit 16, and a branch target information storage unit 17. Each component of the processor 13 operates in synchronization with a clock signal from a clock generator (not illustrated). The instruction fetch unit 14, the instruction decoding unit 15, and the instruction execution unit 16 compose an instruction pipeline, where each unit operates in parallel in synchronization with the clock signal.

The instruction fetch unit 14 fetches code from the external memory 11, stores it into a fetched instruction buffer 142, and sends the stored code to the instruction decoding unit 15. The instruction fetch unit 14 includes a fetched instruction counter (FIC) 141, the fetched instruction buffer (FIB) 142, and a selection unit 143.

The FIC 141 stores a fetch address from which code is to be fetched and sends the fetch address to the external memory 11. After the code has been fetched, the FIC 141 is incremented to update the fetch address. When the high-speed loop instruction is executed, the fetch address in the FIC 141 is updated to an address sent from the branch target information storage unit 17 according to control signals from the instruction decoding unit 15.

The FIB 142 is an FIFO (First In First Out) memory for storing the code fetched from the external memory 11.

The selection unit 143 selects code stored in the branch target information storage unit 17 only when the high-speed loop instruction is executed. When other instructions are executed, the selection unit 143 selects code in the FIB 142. The selection unit 143 then outputs the selected code to the instruction decoding unit 15.

The instruction decoding unit 15 decodes an instruction included in the code sent from the instruction fetch unit 14 and outputs the decoding result which is composed of control signals for controlling the operations of the instruction fetch unit 14, the instruction decoding unit 15, the instruction execution unit 16, and the branch target information storage unit 17. The instruction decoding unit 15 includes a decoded instruction counter (DIC) 151, a decoded instruction buffer (DIB) 152, and an instruction decoder 153.

The DIC 151 stores and updates a pointer that is the sum of an address of an instruction which is being decoded and a predetermined shift value. When reset, such as on powering on, the DIC 151 is initialized to a value that is the sum of a start address and the shift value 4. When a non-branch instruction has been decoded, the DIC 151 is incremented by the word length of the decoded instruction and as a result updated to a pointer that is the sum of an address of an instruction to be decoded next and the shift value 4. When the high-speed loop instruction has been decoded, the pointer in the DIC 151 is updated to an address sent from the branch target information storage unit 17 in accordance with control signals from the instruction decoding unit 15. It should be noted that the shift value needs to be equal to a storage size (the number of bytes) of a branch target instruction register 171 in the branch target information storage unit 17. For example, if the storage size of the branch target instruction register 171 is 8 bytes, the pointer in the DIC 151 will be the sum of a currently-decoded instruction address and the shift value 8.

The DIB 152 is a register for storing an instruction that has been sent from the FIB 142 and that is being decoded.

The instruction decoder 153 decodes the instruction stored in the DIB 152 and outputs control signals for controlling the instruction fetch unit 14, the instruction decoding unit 15, the instruction execution unit 16, and the branch target information storage unit 17 in accordance with the decoding result. When the decoded instruction concerns a pointer in the DIC 151, the instruction decoder 153 controls the instruction execution unit 16 to adjust the pointer in the DIC 151 by appropriately adding/subtracting the shift value 4 according to a content of the instruction. However, the above adjustment is not necessary when the high-speed loop instruction is decoded.

The instruction execution unit 16 is composed of an ALU (arithmetic logic unit), a shifter, and other components, and performs operations and controls the components of the processor 13 according to the control signals sent from the instruction decoding unit 15. The instruction execution unit 16 also inputs/outputs control signals on signal lines connected to the processor 13 (not illustrated).

The branch target information storage unit 17 stores branch target information when the instruction decoding unit 15 has decoded the register instruction. Here, the branch target information means code (4 bytes in the present embodiment) starting from the first instruction of the loop stored in the FIB 142, to which the last instruction of the loop is to branch. The branch target information storage unit 17 includes the branch target instruction register (BIR) 171 and a branch target fetch address register (BAR) 172.

The BIR 171 is a register for storing the first 4 bytes of code from the FIB 142 when the instruction decoding unit 15 decodes the register instruction. By doing so, the first 4 bytes of the loop are stored in the BIR 171. The BIR 171 is also referred to as the loop instruction buffer.

The BAR 172 is a register for storing a pointer from the DIC 151 in the next cycle when the instruction decoding unit 15 has decoded the register instruction. This pointer is the sum of a currently-decoded instruction address and the storage size of the BIR 171 (4 bytes) and thus corresponds to an address of code that follows the code stored in the BIR 171. That is to say, the pointer stored in the BAR 172 is a fetch address from which code is to be fetched by the instruction fetch unit 14 after a branch from the high-speed loop instruction is executed. The BAR 172 is also referred to as the loop address buffer.

<Detailed Construction of Decoded Instruction Counter 151>

Figure 2:
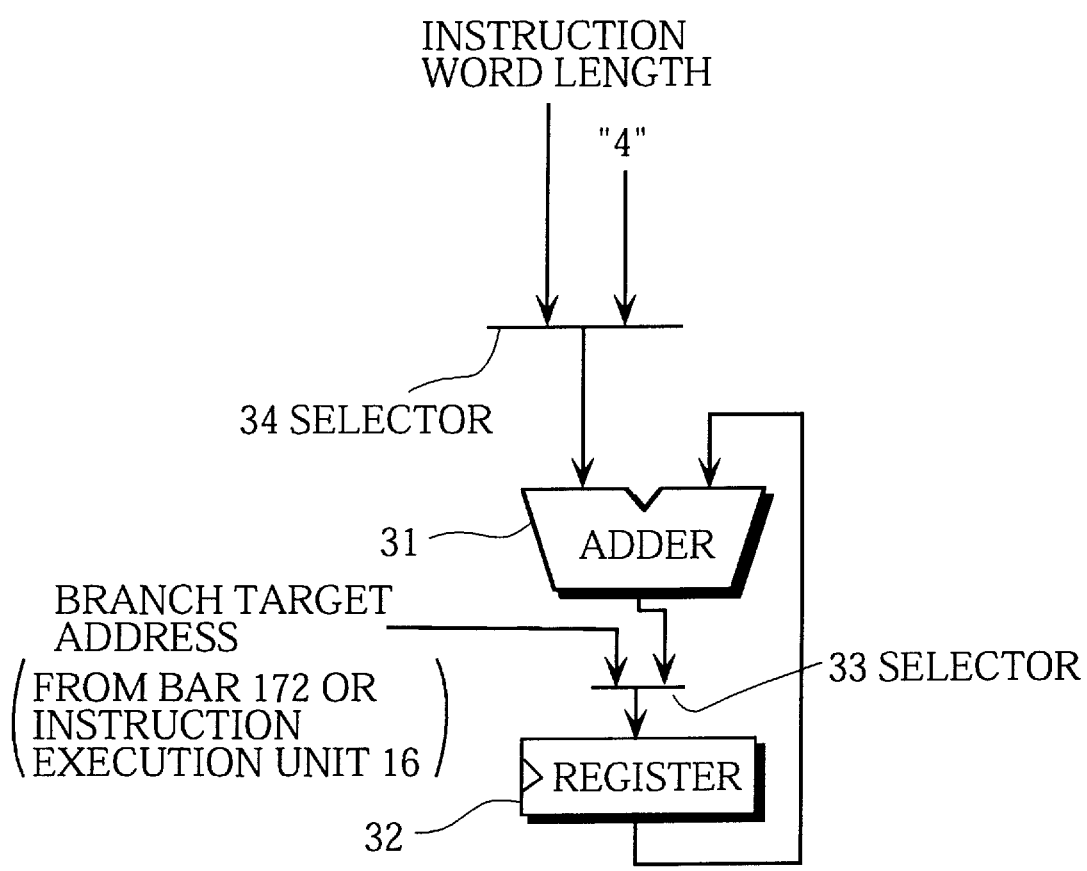
FIG. 2 shows the detailed construction of the decoded instruction counter 151.

FIG. 2 shows an example of the construction of the DIC 151. As shown in the figure, the DIC 151 includes an adder 31, a register 32, and selectors 33 and 34.

When the DIC 151 is initialized, such as on resetting, the adder 31 adds the fixed value 4 to the start address of the register 32.

The adder 31 usually adds the word length (the number of bytes) of a decoded instruction to a pointer in the register 32. By doing so, the register 32 is updated to a pointer that is "(an address of an instruction to be decoded)+4". When a branch instruction has been executed, the pointer in the register 32 is updated to a branch target address that is inputted via the selector 33.

<Processing of Register instruction and High-Speed Loop Instruction>

Figure 3:
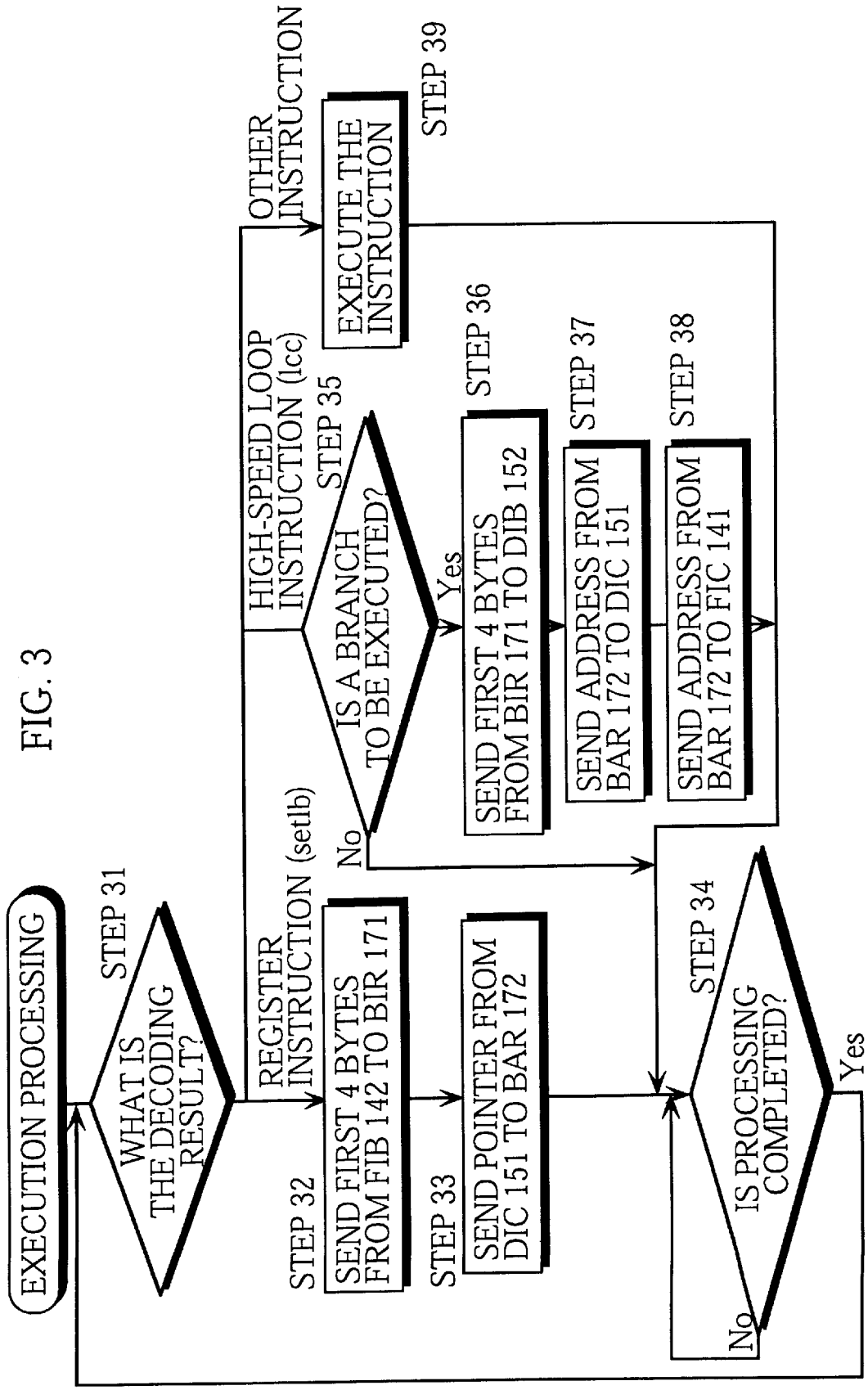
FIG. 3 is a flowchart showing the processing in the instruction execution stage.

FIG. 3 is a flowchart showing the processing of the register instruction which is set immediately before the loop, the high-speed loop instruction which is set at the end of the loop, and other instructions.

When a decoding result by the instruction decoder 153 is the register instruction (setlb) (Step S31), the first 4 bytes of code are sent from the FIB 142 to the BIR 171 (Step S32), and then the pointer in the DIC 151 is sent to the BAR 172 (Step S33). As a result, the BIR 171 stores the first 4 bytes of code of the loop, while the BAR 172 stores the address of the code that follows the first 4 bytes of code. On completing the execution of the register instruction, the processor 13 proceeds to the next instruction execution stage (Step S34).

When the decoding result by the instruction decoder 153 is the high-speed loop instruction (lcc) (Step S31), it is judged whether a branch condition is satisfied (Step S35). In the branch processing, the first 4 bytes of code of the loop are sent from the BIR 171 to the DIB 152 (Step S36), and the address is sent from the BAR 172 to the DIC 151 (Step S37) and to the FIC 141 (Step S38). As a result, the FIC 141 stores the fetch address of the code following the first 4 bytes of code, while the DIC 151 stores a pointer which is the sum of the address of the currently decoded instruction (first instruction) and 4. Since the instruction fetch unit 14 does not need to fetch the first instruction which is the branch target, no branch hazard will occur. Also, the FIC 141 can easily obtain the address of the code that follows the first 4 bytes of code from the BAR 172 without conducting specific address calculations.

<Detailed Constructions of Selection Unit 143 and Branch Target Instruction Register 171>

Figure 4:
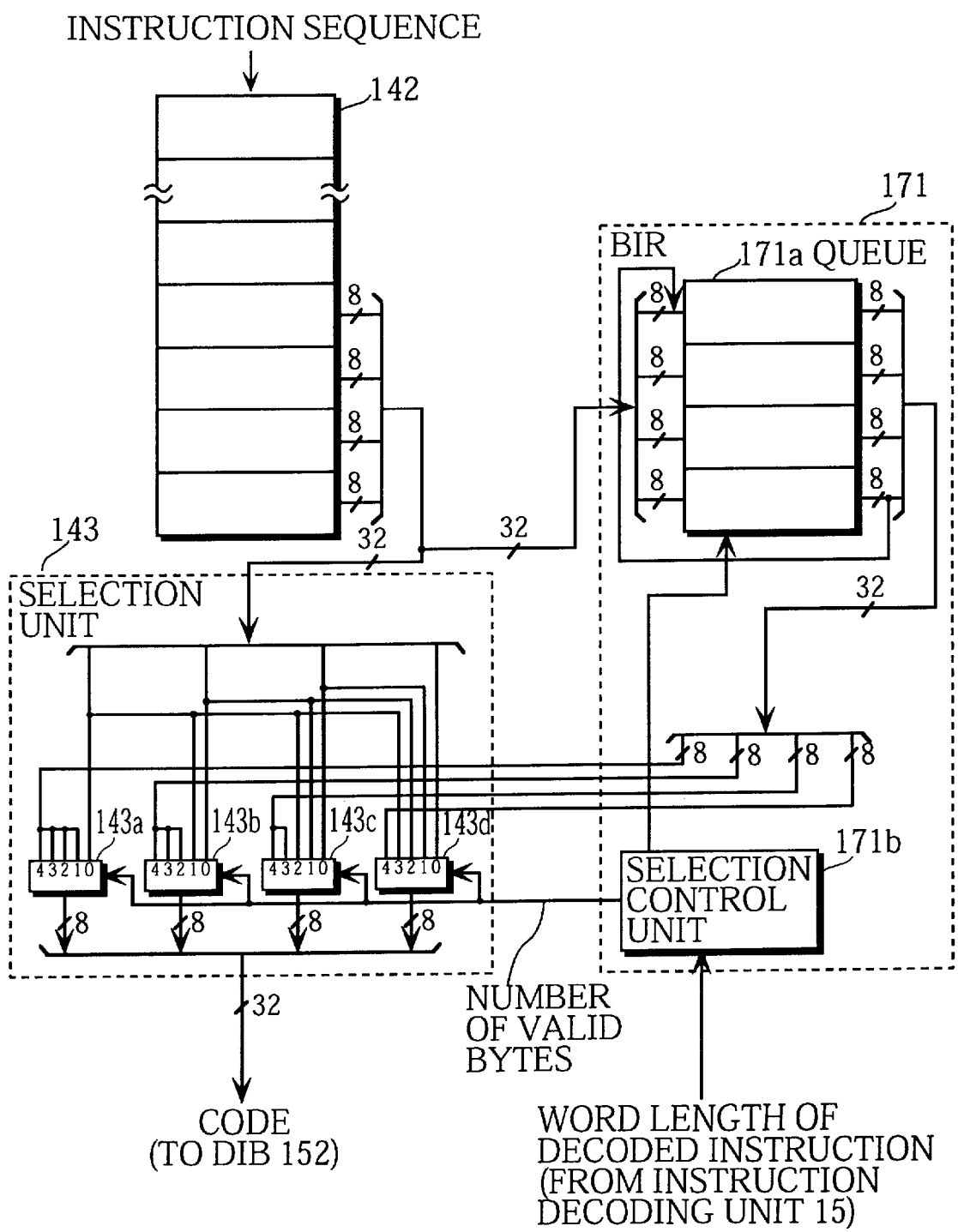
FIG. 4 is a block diagram showing the detailed constructions of the selection unit 143 and the branch target instruction register 171.

FIG. 4 is a block diagram showing the detailed constructions of the selection unit 143 and the BIR 171. The figure also shows the FIB 142. Note that each instruction of the program has a variable word length (an integer multiple of 8 bits).

The FIB 142 is constructed as a queue which shifts fetched code in units of 8 bits, the queue preferably having about 16 levels. The FIB 142 outputs the first 4 bytes of the queue to the DIB 152 via the selection unit 143 in each cycle of the instruction decoding stage. The instruction decoding unit 15 decodes the 4 bytes of code and notifies the FIB 142 of the instruction word length (expressed as a number of bytes for one instruction starting from the start of the 4 bytes of code). The FIB 142 shifts the code by the notified word length towards the front of the queue and so deletes the decoded instruction. By doing so, a first byte of an instruction is usually at the front of the queue (it is not necessarily the case immediately after a branch from the high-speed loop instruction is executed).

The BIR 171 includes a queue 171a and a selection control unit 171b.

The queue 171a is constructed as a 4-level queue which circularly shifts code in units of 8 bits. When the register instruction is decoded and executed, the queue 171a stores the first 4 bytes of code of the FIB 142, which are then outputted to the DIB 152 via the selection unit 143 after the high-speed loop instruction is decoded. The instruction decoding unit 15 decodes the 4 bytes of code and notifies the queue 171a of the instruction word length via the selection control unit 171b. The queue 171a shifts the code by the notified word length circularly towards the front of the queue. The queue 171a repeats the shifting until the 4 bytes make one round, so as to recover the original storage state where the 4 bytes are stored in the queue 171a according to the register instruction. This operation is performed again next time a branch from the high-speed loop instruction is executed.

When a branch from the high-speed loop instruction is executed, the selection control unit 171b controls the selection unit 143 to select the 4 bytes of code stored in the queue 171a instead of the 4 bytes of code stored in the FIB 142. In this control processing, the selection control unit 171b has the queue 171a output all 4 bytes of code to the instruction decoding unit 15 via the selection unit 143 immediately after the branch. The instruction decoding unit 15 decodes the code and notifies the queue 171a of the instruction word length. The selection control unit 171b has the queue 171a shift the code by the notified word length circularly and counts the number of valid bytes of code in the queue 171a. Then the selection control unit 171b controls the selection unit 143 according to the number of valid bytes in the next instruction decoding stage.

The selection unit 143 includes selectors 143a–143d. When the high-speed loop instruction has been executed and the 4 bytes of code sent from the BIR 171 have been decoded by the instruction decoding unit 15, the selection unit 143 selects following 4 bytes of code by combining valid code in the queue 171a and subsequent code in the FIB 142.

FIG. 5 shows the selection logic of the selectors 143a–143d. In accordance with the number of valid bytes notified by the selection control unit 171b, the selectors 143a–143d output 4 bytes of code by combining the valid code in the queue 171a and the subsequent code in the FIB 142. Note that while FIG. 5 shows the case when four 5 input-1 output ("5 to 1") 8-bit selectors are used, a combination of a "2 to 1", a "3 to 1", a "4 to 1", and a "5 to 1" selectors may alternatively be used.

<Branch Instruction Processing>

As described above, the DIC 151 stores a pointer which is the sum of a currently-decoded instruction address and the fixed value 4. Accordingly, when executing instructions for reading from or writing into the DIC 151, it is necessary to adjust the pointer by adding or subtracting the value 4. This adjustment is necessary when executing addressing instructions other than the high-speed loop instruction.

FIG. 6 shows the operation contents of branch instructions. In the figure, the simple branch instruction "branch abs_adrs", the subroutine call instruction "call abs_adrs", and the subroutine return instruction "ret" are representative instructions for absolute addressing, while the simple branch instruction "branch rel_adrs" is a representative instruction for relative addressing. The code "abs_adrs" indicates a 32-bit absolute address, while the code "rel adrs" indicates an 8-bit or 16-bit relative address.

When processing the simple branch instruction "branch abs adrs", the instruction execution unit 16 stores the absolute address "abs-adrs" into the FIC 141 (Operation 601), adds the fixed value 4 to the absolute address "abs_adrs", and stores the sum into the DIC 151 (Operation 602). By doing so, the fetch, decoding, and execution processing will be started from an instruction specified by the absolute address "abs_adrs". Thus, to execute a branch instruction which specifies a branch target by absolute addressing, the value obtained by adding 4 to the absolute address is set in the DIC 151.

When processing the subroutine call instruction "call abs_adrs", the instruction execution unit 16 stores the absolute address "abs_adrs" into the FIC 141 (Operation 603), adds a decoded instruction word length to the pointer in the DIC 151 (Operation 604), subtracts 4 from the sum, pushes the subtracting result onto a stack (not illustrated) (Operation 605), and stores the sum of the absolute address "abs_adrs" and 4 into the DIC 151 (Operation 606). Here, the subtracting result corresponds to an address of an instruction which was being decoded during the execution of the subroutine call instruction "call abs_adrs". In other words, the subtracting result corresponds to an address of an instruction subsequent to the subroutine call instruction "call abs_adrs". Thus, to execute a subroutine call instruction, the value obtained by subtracting 4 from the pointer in the DIC 151 is pushed onto the stack.

When processing the subroutine return instruction "ret", the instruction execution unit 16 pops the instruction address following the subroutine call instruction "call abs_adrs" from the stack, stores the address into the FIC 141 (Operation 607), adds 4 to the address, and stores the sum into the DIC 151 (Operation 608). Thus, to execute a return instruction from a subroutine, the sum of the value pushed onto the stack and 4 is stored back into the DIC 151.

When processing the simple branch instruction "branch rel_adrs", the instruction execution unit 16 adds the relative address "rel_adrs" to the pointer of the DIC 151, stores the sum into the DIC 151 (Operation 609), subtracts 4 from the sum, and stores the subtracting result into the FIC 141 (Operation 610). Thus, to execute a branch instruction which specifies a branch target by relative addressing, the value obtained by subtracting 4 from the new pointer in the DIC 151 is set in the FIC 141. Note that this subtraction of 4 from the pointer in the DIC 151 to set the address in the FIC 141 is unnecessary when executing the high-speed loop instruction.

As described above, when executing a branch instruction with an absolute address, the DIC 151 can simply be updated to the sum of the absolute address and 4, while the FIC 141 can be updated to the absolute address.

Also, when executing a branch instruction with a relative address, the DIC 151 can simply be updated to the sum of the relative address and the pointer in the DIC 151, while the FIC 141 can be updated to the value obtained by subtracting 4 from this sum.

The above addition and subtraction using the fixed value 4 are performed by the ALU in the instruction execution unit 16. Thus, the instruction execution unit 16 performs address calculations for all branch instructions other than the high-speed loop instruction.

<Operation>

The following is an explanation of the operation of the processor of the present embodiment using an example program.

Figure 7:
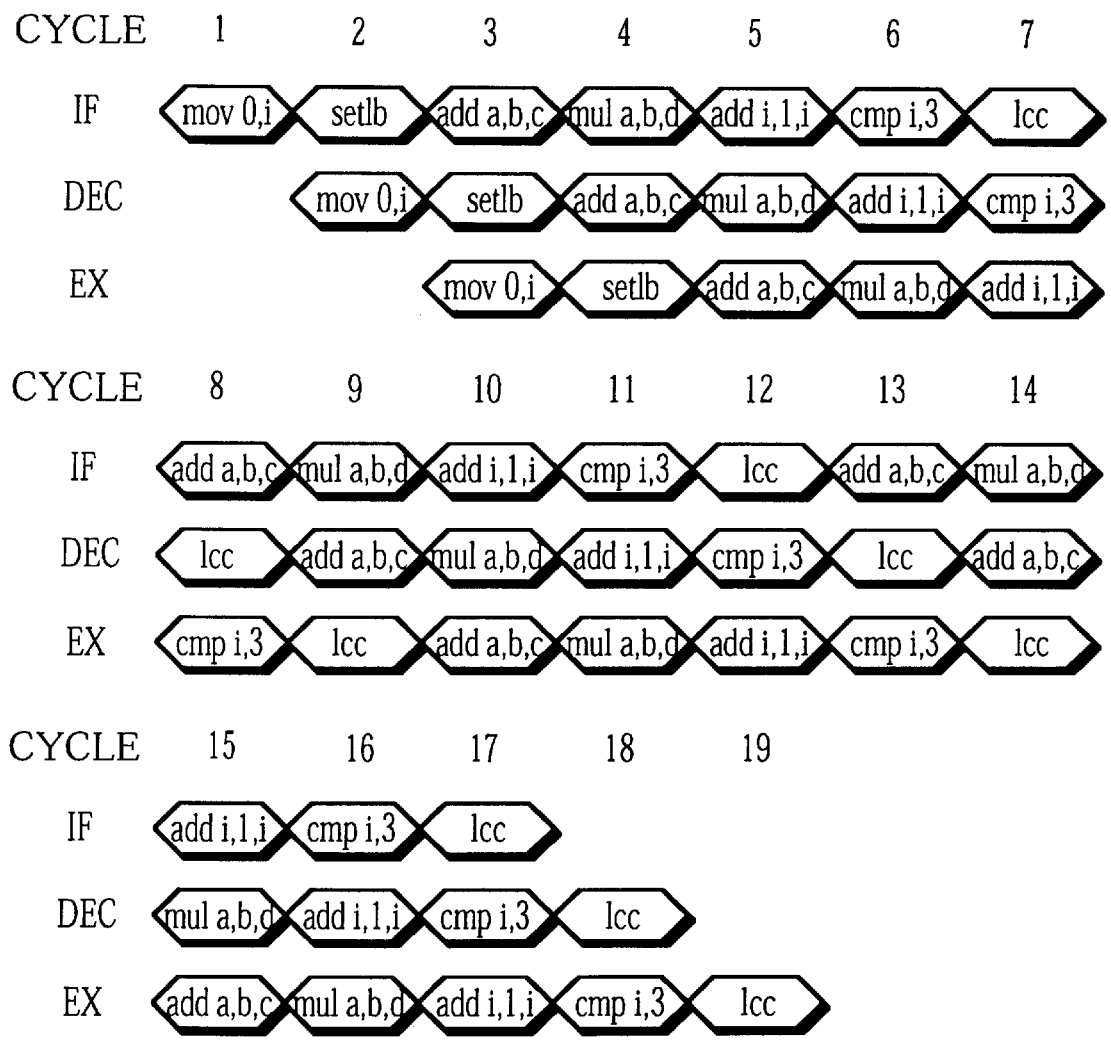
FIGS. 7 shows a flow of a pipeline formed when the processor executes the loop.

FIG. 7 shows a flow of a pipeline formed when executing the program shown below.

(Example Program)

| instruction address | | instruction | comment |
|---|---|---|---|
| 1000 | | mov 0, i | transfer 0 into i |
| 1002 | | setlb | store branch target |
| | L: | | label |
| 1003 | | add a, b, c | transfer a + b into c |
| 1005 | | mul a, b, d | transfer a × b into d |
| 1007 | | add i, 1, i | add 1 to i |
| 1009 | | comp i, 3 | compare i and 3 |
| 100B | | lcc L | branch to L if i<3 |

In this example program, "instruction address" shows lowest 16 bits of a 32-bit address in hexadecimal, "instruction" is written in mnemonic form, and "comment" shows instruction contents.

In the program, the processing from the instruction (add a,b,c) that follows the register instruction (setlb) to the high-speed loop instruction (lcc) is a loop which is repeated three times.

In FIG. 7, the horizontal axis shows time in cycle units, while the vertical axis shows three pipeline stages that are IF, DEC, and EX. "IF stage" shows an instruction at the front of the FIB 142, though it shows an instruction at the front of the BIR 171 in cycles 8, 9, 13, and 14. "DEC stage" shows a currently decoded instruction which is stored in the DIB 152. "EX stage" shows an instruction which is currently being executed by the instruction execution unit 16.

When the register instruction "setlb" is decoded in cycle 3, 4 bytes of code ("add a,b,c" and "mul a,b,d") are sent from the FIB 142 to the BIR 171. In cycle 4, the register instruction "setlb" is executed, and a pointer which is the sum of an address of the currently decoded instruction "add a,b,c" and 4 is sent from the DIC 151 to the BAR 172. As a result, the value 1007 (1003+4) that is the address of the instruction "add i,l,i" is stored in the BAR 172.

Next, when executing the high-speed loop instruction "lcc L" in cycle 9 following the decoding stage in cycle 8, the 4 bytes of code are sent from the BIR 171 to the DIB 152, and the address of the instruction "add i,l,i" is sent from the BAR 172 to the FIC 141. As a result, the address of the instruction "add i,l,i" that follows the 4 bytes of code stored in the BIR 171 is set in the FIC 141 as a fetch address.

The same operation is performed when the high-speed loop instruction "lcc L" is decoded in cycle 13 and executed in cycle 14.

In the processor of the present embodiment, the DIC 151 stores a pointer that is the sum of a currently-decoded instruction address and the shift value 4. Accordingly, it is unnecessary to equip the processor with an adder specifically used for calculating a fetch address of code following the branch target information by adding 4 to the branch target instruction address when the register instruction "setlb" is executed.

Also, when a branch from the high-speed loop instruction "lcc L" is executed, the FIC 141 and the DIC 151 receive the same address from the BAR 172. It is unnecessary to perform address calculations separately for the FIC 141 and the DIC 151, so that the processor does not need to be equipped with a specific subtractor.

Second Embodiment

Figure 8:
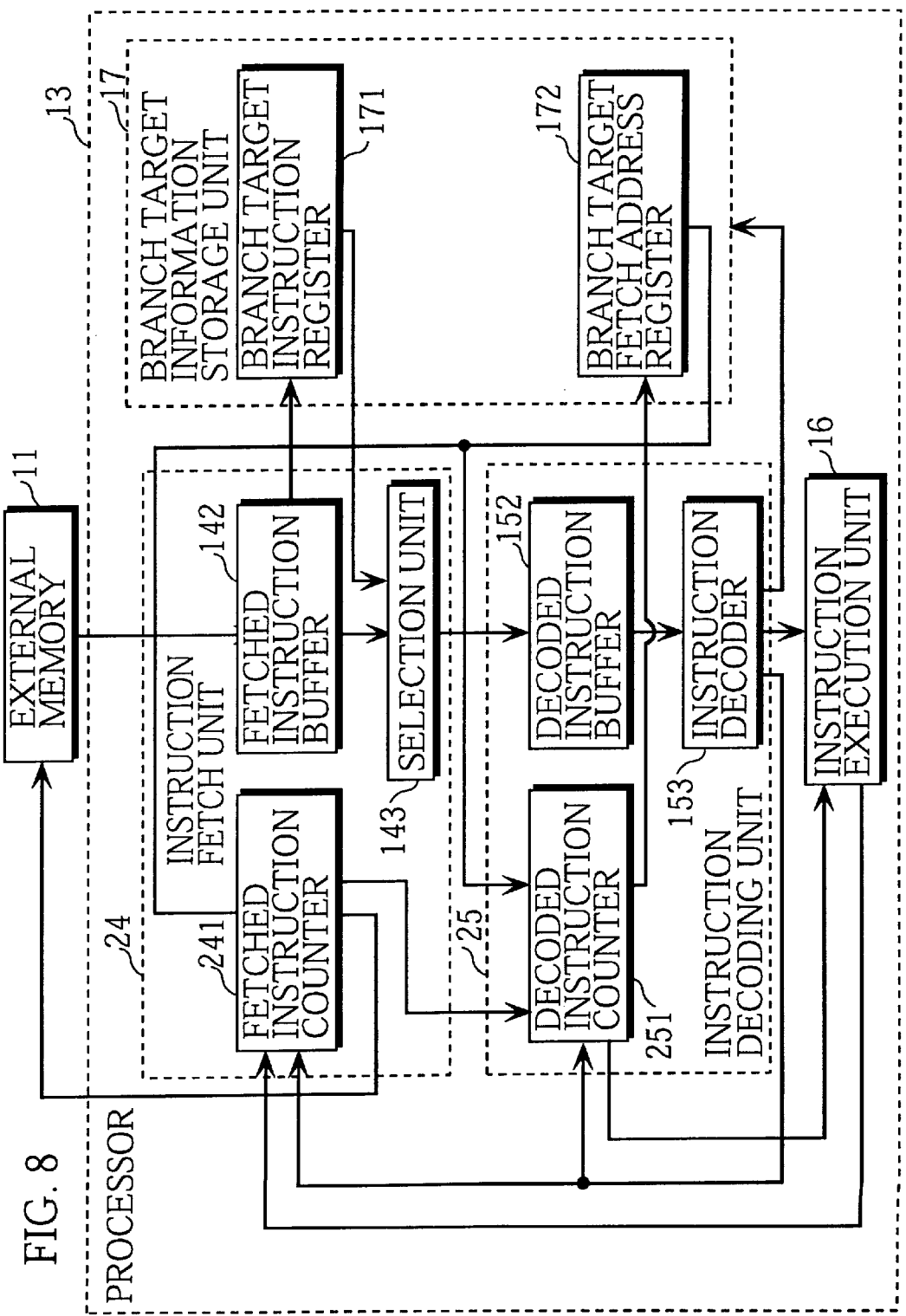
FIG. 8 is a block diagram showing the construction of the processor of the second embodiment of the present invention.

FIG. 8 is a block diagram showing the construction of the processor of the second embodiment of the present invention.

The difference with the processor 13 of the first embodiment shown in FIG. 1 lies in that the FIC 141 is replaced with a FIC 241 and the DIC 151 is replaced with a DIC 251. The processor 13 of the second embodiment is constructed such that a pointer to be stored in the DIC 251 is calculated by an instruction fetch unit 24 when a branch instruction is executed, while the pointer 10 is calculated by the instruction execution unit 16 in the first embodiment. The following explanation focuses on this difference.

<Detailed Construction of Fetched Instruction Counter 241>

Figure 9:
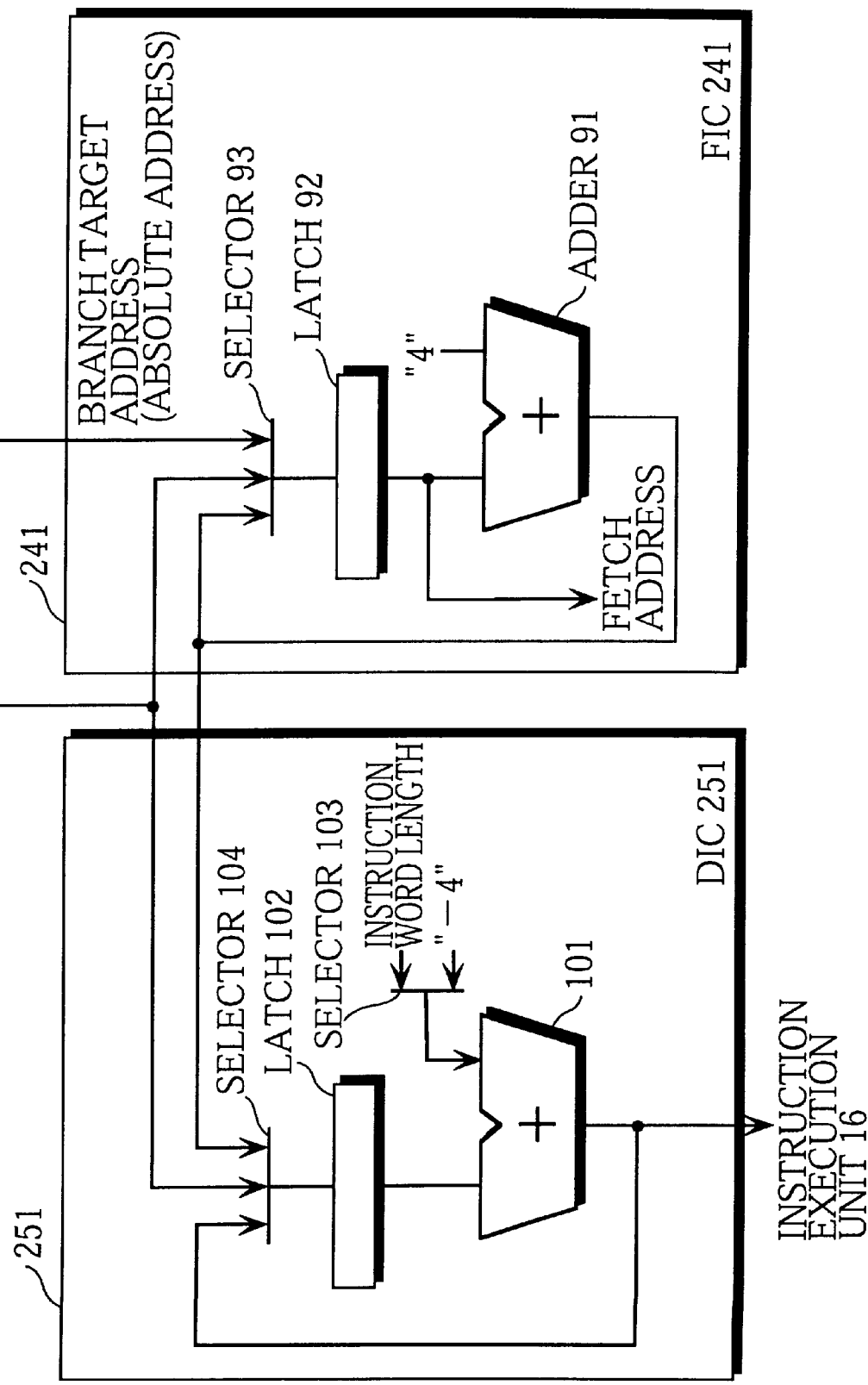
FIG. 9 is a block diagram showing the detailed constructions of the fetched instruction counter 241 and the decoded instruction counter 251.

FIG. 9 is a block-diagram showing the detailed constructions of the FIC 241 and the DIC 251.

The FIC 241 includes an adder 91, a latch 92, and a selector 93.

A loop circuit that is made up of the adder 91, the latch 92, and the selector 93 composes a counter that is incremented by 4. When the FIB 142 has an unoccupied area of 4 bytes or more, the instruction fetch unit 24 fetches 4 bytes of code and increments the FIC 241.

When a non-branch instruction is executed, the selector 93 selects the output of the adder 91. When a branch instruction other than the high-speed loop instruction is executed, the selector 93 selects a branch target address sent from the instruction execution unit 16. When, on the other hand, the high-speed loop instruction is executed, the selector 93 selects an address sent from the BAR 172. The selector 93 then outputs the selected address to the adder 91. The output of the latch 92 is sent to the external memory 11 as a fetch address.

<Detailed Construction of Decoded Instruction Counter 251>

In FIG. 9, the DIC 251 includes an adder 101, a latch 102, and selectors 103 and 104.

A loop circuit that is made up of the adder 101, the latch 102, and the selector 103 composes a counter that is incremented by the word length of a decoded instruction in each instruction decoding stage.

When a non-branch instruction is decoded, the adder 101 adds the word length of the decoded instruction to the pointer in the latch 102 in the second half of the instruction decoding stage. When a branch instruction (except the high-speed loop instruction) that concerns the pointer in the DIC 251 is executed, the adder 101 adds "−4" to the pointer in the latch 102.

The latch 102 stores a pointer that is the sum of a currently-decoded instruction address and the shift value 4. When initialized, the latch 102 stores "(the start address)+4" sent from the FIC 241.

The selector 103 usually selects the word length of the decoded instruction which is provided by the instruction decoding unit 25. When an instruction such as a branch instruction with a relative address or a subroutine call instruction is executed, the selector 103 selects "−4" to adjust the pointer.

When a non-branch instruction is executed, the selector 104 selects the output of the adder 101. When the high-speed loop instruction is executed, the selector 104 selects the output of the BAR 172. When a branch instruction other than the high-speed loop instruction is executed, the selector 104 selects the output "(branch target address)+4" of the adder 91 in the FIC 241.

<Calculation of Branch Target Address>

FIG. 10 shows the operation contents of the same addressing instructions as FIG. 6, that is, the simple branch instruction "branch abs_adrs", the subroutine call instruction "call abs_adrs", the subroutine return instruction "ret", and the simple branch instruction "branch rel adrs". Note that operations written above the dashed line are conducted in the instruction decoding stage, while operations written below the dashed line are conducted in the instruction execution stage.

When processing the simple branch instruction "branch abs_adrs", the instruction execution unit 16 stores the absolute address "abs_adrs" into the FIC 241 (Operation 1001), and the adder 91 in the instruction fetch unit 24 adds 4 to the address stored in the FIC 241, the sum then being stored into the DIC 251 (Operation 1002). Thus, when processing a branch instruction ADO that specifies a branch target by absolute addressing, the adder 91 in the FIC 241 is used to add the shift value 4 so as to calculate the pointer in the DIC 251.

When processing the subroutine call instruction "call abs_adrs", the instruction execution unit 16 stores the absolute address "abs_adrs" into the FIC 241 (Operation 1003). The adder 101 in the DIC 251 adds the instruction word length to the pointer (Operation 1004) and subtracts 4 from the addition result in the DIC 251. The instruction execution unit 16 pushes the subtracting result onto a stack (Operation 1005). The adder 91 in the FIC 241 adds 4 to the absolute address "abs_adrs" stored in the FIC 241, the sum then being stored into the DIC 251 (Operation 1006). Thus, the adder 101 in the DIC 251 is used to subtract the shift value 4 so as to calculate a return address that is pushed onto the stack, while the adder 91 in the FIC 241 is used to add the shift value 4 so as to calculate the pointer in the DIC 251.

When processing the subroutine return instruction "ret", the instruction execution unit 16 pops the return address, that is, an address of an instruction following the subroutine call instruction "call abs_adrs", from the stack and stores the return address into the FIC 241 (Operation 1007). The adder 91 in the FIC 241 adds 4 to the return address, the sum then being stored into the DIC 251 (Operation 1008). Thus, when processing a return instruction, the adder 91 in the FIC 241 is used to add the shift value 4 so as to calculate the pointer in the DIC 251.

When processing the simple branch instruction "branch rel_adrs", the instruction execution unit 16 adds the relative address "rel-adrs" to a value obtained by the adder 101 subtracting 4 from the pointer in the DIC 251 and stores the sum into the FIC 241 (Operation 1009). Then the adder 91 adds 4 to the address stored in the FIC 241 and stores this sum into the DIC 251 (Operation 1010). Thus, when processing a branch instruction that specifies a branch target by relative addressing, the adder 101 in the DIC 251 is used to subtract the shift value 4 while the adder 91 in the FIC 241 is used to add the shift value 4.

As described above, in the processor 13 of the second embodiment, the addition of the shift value 4 in Operations 1002, 1006, 1008, and 1010 is performed by the adder 91 in the FIC 241, while the subtraction of the shift value 4 in Operations 1005 and 1009 is performed by the adder 101 in the DIC 251.

<Timing of Branch Instruction Processing>

Figure 11:
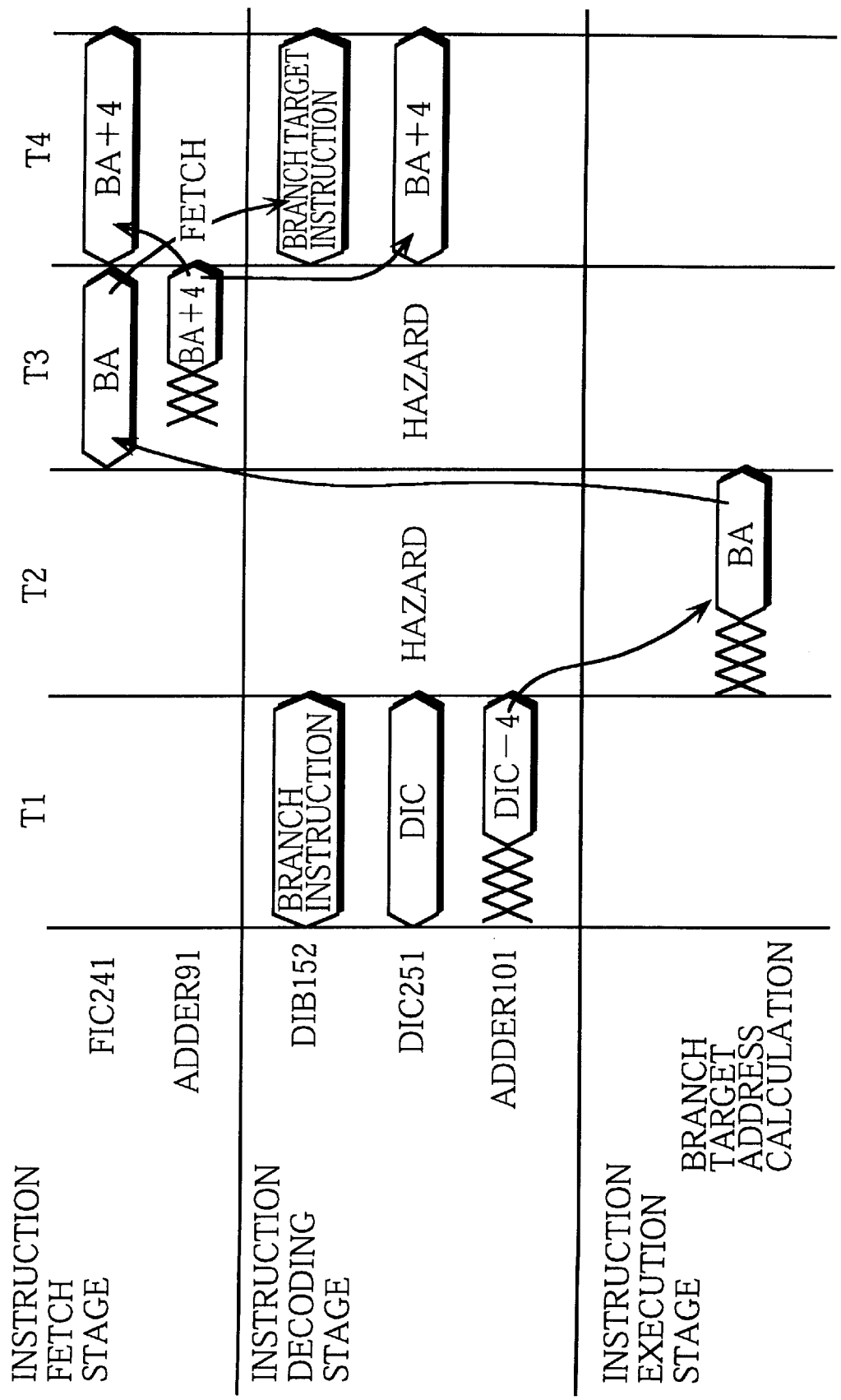
FIG. 11 is a time chart showing the processing of the simple branch instruction "branch rel_adrs"

FIG. 11 is a time chart showing the processing of the simple branch instruction "branch rel adrs".

In the figure, the simple branch instruction "branch rel_adrs" is decoded and executed respectively in cycles T1 and T2, while a branch target instruction is fetched and decoded respectively in cycles T3 and T4.

In cycle T1, the adder 101 subtracts 4 from the pointer in the DIC 251. In cycle T2, the instruction execution unit 16 adds the relative address "rel_adrs" to the subtracting result, so that a branch target address BA is calculated and stored into the FIC 241.

In cycle T3, the branch target address BA is outputted from the FIC 241 to the external memory 11 to fetch code (4 bytes) of a branch target instruction. The adder 91 adds 4 to the branch target address BA in FIC 241 in the second half of cycle T3.

In cycle T4, the sum obtained by the adder 91 is stored into the FIC 241 and the DIC 251.

While the processing unit of the processor is set at 32 bits in the above embodiments, the present invention is not limited to such. Accordingly, the processor may also process data in 16- or 64-bit units. Also, while the storage size of the BIR 171 is 4 bytes (32 bits) in the above embodiments, other storage sizes are applicable as long as at least one instruction can be fetched by the time the instruction decoder completes the decoding of branch target instruction code of that size within the cycle following the decoding of the high-speed loop instruction.

While the program used in the above embodiments is composed of instructions of variable word length, the present invention may also be applied to instructions of fixed word length. In such a case, the constructions of the DIC 151 and the selection unit 143 can further be simplified.

Figure 12:
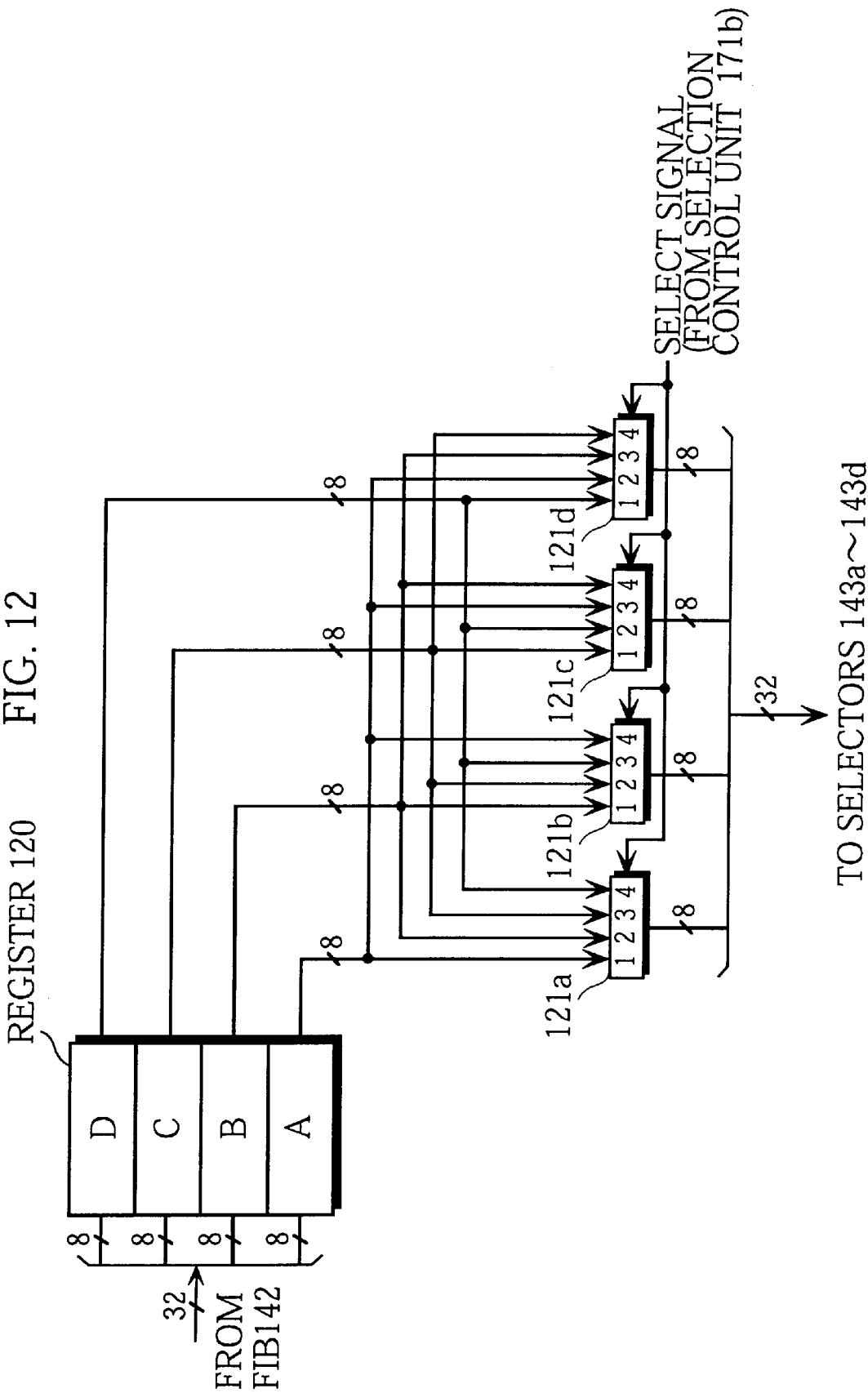
FIG. 12 shows an example of a modification of the queue 171a shown in the FIG. 4.

Also, while the queue 171a (ring buffer) is used in the BIR 171 shown in FIG. 4, the BIR 171 may also be constructed so that any byte in the 4 bytes of code stored in the BIR 171 may be set as the start of the code. FIG. 12 shows an example of such a modification of the queue 171a. In the figure, the queue 171a shown in FIG. 4 is replaced with a 4-byte register 120 and selectors 121a–121d in the BIR 171. The selection logic of the selectors 121a–121d is shown in FIG. 13. For example, the register 120 stores 4 bytes of code A, B, C, and D. If the number of valid bytes is 4, the selectors 121a–121d output the 4 bytes in order of "ABCD" to the DIB 152 via the selectors 143a–143d shown in FIG. 4.

If, on the other hand, the number of valid bytes is 3, the selectors 121a–121d output the 4 bytes in order of "BCDA". On receiving the 4 bytes, the selectors 143a–143d in the instruction fetch unit select the valid 3 bytes "BCD" and combine the valid 3 bytes "BCD" as high order bytes and 1 byte received from the FIB 142 as a low order byte to output 4 bytes of code to the DIB 152. The selection is performed in the same way when the number of valid bytes is 2 or 1.

The construction shown in FIG. 12 enables the branch target instruction register to further increase its processing speed in comparison with when shifting is performed as shown in FIG. 4.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A processor for executing a program loop at a high speed using a register instruction which is set immediately before the program loop and a loop instruction which is set at an end of the program loop, the processor comprising: a fetch unit for fetching code from a memory; a decoding unit for decoding an instruction included in the fetched code; and an execution unit for executing the decoded instruction, the decoding unit including
a decoded instruction counter for storing and updating a pointer specifying an instruction that is being decoded, the pointer being a sum of a fixed shift value and an address of the instruction that is being decoded, and the execution unit including:
storage means for storing, when the decoding unit decodes the register instruction, instruction code at a start of the program loop that has been fetched by the fetch unit into a first buffer and storing the pointer stored in the decoded instruction counter into a second buffer; and high-speed branch means for having the fetch unit fetch code, when the loop instruction has been decoded by the decoding unit and a branch condition is satisfied, starting from an address that corresponds to the pointer stored in the second buffer and for having the decoding unit decode the instruction code stored in the first buffer, wherein the fixed shift value is determined so that the pointer in the second buffer corresponds to an address of code that follows the instruction code stored in the first buffer.

2. The processor of claim 1,
wherein the fixed shift value is equal to a storage size of the first buffer.

3. The processor of claim 2,
wherein the decoded instruction counter, when initialized, stores a sum of a start address and the fixed shift value.

4. The processor of claim 3,
wherein the fetch unit includes an adder that increments a fetch address from which code is to be fetched by the fixed shift value; and
wherein the decoded instruction counter stores an output of the adder as the pointer when the fetch address is initialized to the start address.

5. The processor of claim 1,
wherein the execution unit further includes
branch means for sending, when a branch instruction with an absolute address is decoded by the decoding unit, the absolute address to a fetched instruction counter in the fetch unit and sending a value, obtained by adding the fixed shift value to the absolute address, to the decoded instruction counter.

6. The processor of claim 5,
wherein, when a branch instruction with a relative address is decoded by the decoding unit, the branch means sends a value, obtained by adding the relative address to the pointer stored in the decoded instruction counter, to the decoded instruction counter and sends a value, obtained by subtracting the fixed shift value from the value which is sent to the decoded instruction counter, to the fetched instruction counter.

7. The processor of claim 5,
wherein the fetched instruction counter includes a register for storing a fetch address and an adder for incrementing the fetch address stored in the register, and
wherein, when the branch instruction with the absolute address is decoded by the decoding unit, the branch means has the adder in the fetched instruction counter add the fixed shift value to the absolute address and sends an adding result to the decoded instruction counter.

8. A processor for performing pipeline processing that has at least three stages including a fetch stage, a decoding stage, and an execution stage and for executing a program loop at a high speed using a register instruction which is set immediately before the program loop and a loop instruction which is set at an end of the program loop, the processor comprising: a fetch unit for fetching code from a memory in the fetch stage; a decoding unit for decoding an instruction included in the fetched code in the decoding stage; and an execution unit for executing the decoded instruction in the execution stage,
the fetch unit including:
a fetched instruction counter for storing and updating a fetch address; and
a fetched instruction buffer for storing the fetched code,
the decoding unit including:
a decoded instruction buffer for storing an instruction that is being decoded, the instruction being included in the fetched code; and
a decoded instruction counter for storing and updating a pointer indicating the instruction that is being decoded, the pointer being a sum of a fixed shift value and an address of the instruction that is stored in the decoded instruction buffer and that is being decoded, and
the execution unit including:
a first buffer having an area for storing code;
a second buffer having an area for storing an address;
storage means for storing, when the register instruction is decoded by the decoding unit, the code stored in the fetched instruction buffer into the first buffer and storing the pointer stored in the decoded instruction counter into the second buffer,
wherein the code stored in the first buffer is instruction code at a start of the program loop,
wherein the fixed shift value is equal to a storage size of the first buffer, and
wherein the pointer stored in the second buffer corresponds to an address of code that follows the instruction code stored in the first buffer; and
high-speed branch means, when the loop instruction has been decoded by the decoding unit and a branch condition is satisfied, for sending the pointer in the second buffer to the fetched instruction counter and sending the instruction code in the first buffer to the decoded instruction buffer.

9. The processor of claim 8,
wherein the decoded instruction counter, when initialized, stores a sum of a start address and the fixed shift value.

10. The processor of claim 9,
wherein the fetched instruction counter includes an adder that increments the fetch address by the fixed shift value; and
wherein the decoded instruction counter stores an output of the adder as the pointer when the fetch address is initialized to the start address.

11. The processor of claim 9,
wherein the program loop is composed of a plurality of instructions having variable word lengths,
wherein the processor further comprises:
selection means for selecting code whose total amount is equivalent to a storage size of the decoded instruction buffer from the first buffer and from the fetched instruction buffer and outputting the selected code to the decoded instruction buffer; and
a selection control unit for controlling the selection means to select the code first from the first buffer and then from the fetched instruction buffer,
wherein the high-speed branch means activates the selection control unit when the loop instruction has been decoded and the branch condition is satisfied, and
wherein the selection means selects the code from the fetched instruction buffer when the selection control unit is not activated.

12. The processor of claim 8,
wherein the execution unit further includes
branch means for sending, when a branch instruction with an absolute address is decoded by the decoding unit, the absolute address to the fetched instruction counter and sending a value, obtained by adding the fixed shift value to the absolute address, to the decoded instruction counter.

13. The processor of claim 12,
wherein, when a branch instruction with a relative address is decoded by the decoding unit, the branch means sends a value, obtained by adding the relative address to the pointer stored in the decoded instruction counter, to the decoded instruction counter and sends a value, obtained by subtracting the fixed shift value from the value which is sent to the decoded instruction counter, to the fetched instruction counter.

14. The processor of claim 12,
wherein the fetched instruction counter includes a register for storing the fetch address and an adder for incrementing the fetch address stored in the register, and wherein, when the branch instruction with the absolute address is decoded by the decoding unit, the branch means has the adder in the fetched instruction counter add the fixed shift value to the absolute address and sends an adding result to the decoded instruction counter.

15. The processor of claim 13, wherein the fetched instruction counter includes:

an address register for storing the fetch address; and a first adder for incrementing the fetch address in the address register by a predetermined value, wherein the decoded instruction counter includes:

a pointer register for storing the pointer; and a second adder for incrementing the pointer in the pointer register by a word length of a decoded instruction, wherein, when the branch instruction with the relative address is decoded by the decoding unit, the branch means:

has the second adder subtract the fixed shift value from the pointer in the pointer register;

stores a sum of a subtracting result and the relative address into the address register as a branch target address;

has the first adder add the predetermined value to the branch target address stored in the address register, the predetermined value being the fixed shift value; and stores an adding result into the pointer register.

16. A processor for performing pipeline processing that has at least three stages including a fetch stage, a decoding stage, and an execution stage and for executing a program loop at a high speed using a register instruction which is set immediately before the program loop and a loop instruction which is set at an end of the program loop, the processor comprising: a fetch unit for fetching code from a memory in the fetch stage; a decoding unit for decoding an instruction included in the fetched code in the decoding stage; and an execution unit for executing the decoded instruction in the execution stage, the fetch unit including:

a fetched instruction counter for storing and updating a fetch address; and a fetched instruction buffer for storing the fetched code, the decoding unit including:

a decoded instruction buffer for storing an instruction that is being decoded, the instruction being included in the fetched code; and a decoded instruction counter for storing and updating a pointer indicating the instruction that is being decoded, the pointer being a sum of a fixed shift value and an address of the instruction that is stored in the decoded instruction buffer and that is being decoded, and the execution unit including:

a first buffer having an area for storing code;

a second buffer having an area for storing an address;

storage means for storing, when the register instruction is decoded by the decoding unit, the code stored in the fetched instruction buffer into the first buffer and storing the pointer stored in the decoded instruction counter into the second buffer, wherein the code stored in the first buffer is instruction code at a start of the program loop, wherein the fixed shift value is equal to a storage size of the first buffer, and wherein the pointer stored in the second buffer corresponds to an address of code that follows the instruction code stored in the first buffer; and high-speed branch means, when the loop instruction has been decoded by the decoding unit and a branch condition is satisfied, for sending the pointer in the second buffer to the fetched instruction counter and sending the instruction code in the first buffer to the decoded instruction buffer;

wherein the program loop is composed of a plurality of instructions having variable word lengths, wherein the processor further comprises:

selection means for selecting code whose total amount is equivalent to a storage size of the decoded instruction buffer from the first buffer and from the fetched instruction buffer and outputting the selected code to the decoded instruction buffer; and a selection control unit for controlling the selection means to select the code first from the first buffer and then from the fetched instruction buffer, wherein the high-speed branch means activates the selection control unit when the loop instruction has been decoded and the branch condition is satisfied, and wherein the selection means selects the code from the fetched instruction buffer when the selection control unit is not activated.

17. A processor for performing pipeline processing that has at least three stages including a fetch stage, a decoding stage, and an execution stage and for executing a program loop at a high speed using a register instruction which is set immediately before the program loop and a loop instruction which is set at an end of the program loop, the processor comprising: a fetch unit for fetching code from a memory in the fetch stage; a decoding unit for decoding an instruction included in the fetched code in the decoding stage; and an execution unit for executing the decoded instruction in the execution stage, the fetch unit including:

a fetched instruction counter for storing and updating a fetch address; and a fetched instruction buffer for storing the fetched code, the decoding unit including:

a decoded instruction buffer for storing an instruction that is being decoded, the instruction being included in the fetched code; and a decoded instruction counter for storing and updating a pointer indicating the instruction that is being decoded, the pointer being a sum of a fixed shift value and an address of the instruction that is stored in the decoded instruction buffer and that is being decoded, and the execution unit including:

a first buffer having an area for storing code;

a second buffer having an area for storing an address;

storage means for storing, when the register instruction is decoded by the decoding unit, the code stored in the fetched instruction buffer into the first buffer and storing the pointer stored in the decoded instruction counter into the second buffer, wherein the code stored in the first buffer is instruction code at a start of the program loop, wherein the fixed shift value is equal to a storage size of the first buffer, and wherein the pointer stored in the second buffer corresponds to an address of code that follows the instruction code stored in the first buffer; and high-speed branch means, when the loop instruction has been decoded by the decoding unit and a branch condition is satisfied, for sending the pointer in the second buffer to the fetched instruction counter and sending the instruction code in the first buffer to the decoded instruction buffer;

wherein the fetched instruction counter includes:

an address register for storing the fetch address; and a first adder for incrementing the fetch address in the address register by a predetermined value, wherein the decoded instruction counter includes:

a pointer register for storing the pointer; and a second adder for incrementing the pointer in the pointer register by a word length of a decoded instruction, wherein, when the branch instruction with the relative address is decoded by the decoding unit, the branch means:

has the second adder subtract the fixed shift value from the pointer in the pointer register;

stores a sum of a subtracting result and the relative address into the address register as a branch target address;

has the first adder add the predetermined value to the branch target address stored in the address register, the predetermined value being the fixed shift value; and stores an adding result into the pointer register.

\* \* \* \* \*